United States Patent
Sedlar et al.

(10) Patent No.: US 9,062,774 B2
(45) Date of Patent: Jun. 23, 2015

(54) RADIAL SHAFT SEAL WITH STATIC AND HYDRODYNAMIC SEALING FEATURES

(75) Inventors: Brent R. Sedlar, Ann Arbor, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 435 days.

(21) Appl. No.: 13/426,450

(22) Filed: Mar. 21, 2012

(65) Prior Publication Data

US 2013/0249170 A1   Sep. 26, 2013

(51) Int. Cl.
*F16J 15/32* (2006.01)

(52) U.S. Cl.
CPC .......... *F16J 15/3224* (2013.01); *F16J 15/3244* (2013.01)

(58) Field of Classification Search
CPC .............................. F16J 15/324; F16J 15/3244
USPC ......................................................... 277/559
See application file for complete search history.

(56) References Cited

U.S. PATENT DOCUMENTS

| 4,118,856 A | 10/1978 | Bainard et al. |
| 5,664,651 A * | 9/1997 | Miura et al. ............. 188/322.17 |
| 6,688,603 B2 | 2/2004 | vom Schemm |
| 7,494,130 B2 | 2/2009 | Berdichevsky |
| 7,506,875 B2 | 3/2009 | Matsui |
| 7,775,528 B2 | 8/2010 | Berdichevsky |
| 2004/0227304 A1 | 11/2004 | Kern et al. |
| 2007/0057472 A1 | 3/2007 | Hatch |
| 2010/0109252 A1 * | 5/2010 | Matsui et al. ................. 277/559 |
| 2011/0204579 A1 * | 8/2011 | Donovan et al. .............. 277/559 |

FOREIGN PATENT DOCUMENTS

| DE | 19922842 A1 | 11/2000 | |
| GB | 996711 A | 6/1965 | |
| GB | 1459352 A | 12/1976 | |
| JP | 55-47050 | 4/1980 | |
| JP | 03029768 U * | 3/1991 | ............... F16J 15/32 |
| JP | 2009068683 A | 4/2009 | |

OTHER PUBLICATIONS

International Search Report mailed Aug. 16, 2013 (PCT/US2013/033262).

* cited by examiner

*Primary Examiner* — Vishal Patel
(74) *Attorney, Agent, or Firm* — Robert L. Stearns; Dickinson Wright, PLLC

(57) ABSTRACT

A radial shaft seal configured for receipt in a housing and about a shaft to sealingly isolate an air-side of the shaft seal from an oil-side of the shaft seal is provided. The seal includes an annular mounting portion; an elastomeric seal body connected to the mounting portion, and a seal lip connected to the seal body. The seal lip has an annular inner sealing surface extending axially between an oil-side end and a free air-side end. The inner sealing surface has a first groove region and a circumferentially continuous annular static band. The first groove region is spaced axially from the static band and extends between the static band and the oil-side end to pump lubrication toward the oil-side of the seal. The static band prevents the lubrication from leaking from the oil-side to the air-side of the seal.

5 Claims, 3 Drawing Sheets ic Field
This invention relates generally to dynamic oil seals of the type for creating a fluid tight seal between a rotating shaft and a housing.

2. Related Art

Dynamic radial shaft oil seals are designed to have a so-called "oil-side" of the seal and an "air-side." These designations pertain to the orientation of the seal when installed, with the oil-side facing the interior of the housing and in communication with the oil, whereas the air-side faces outwardly and is exposed to the air.

During use, while maintaining an effective seal, it is desirable to keep dust and other contaminants on the air-side of the seal while maintaining lubrication on the oil-side of the seal. It is known to incorporate a static band on a sealing surface of a seal lip with spiral grooves extending from the static band toward an oil-side of the seal to pump lubrication back to the oil-side of the seal. However, with the spiral grooves merging with the static band, at least some of the lubrication, rather than being pumped back to the oil-side of the seal, can bypass the static band, where it tends to remain on the air-side of the static band. This has undesirable affects on the seal by potentially allowing a negative pressure to develop inside the seal and the lubrication to build up on the airside of the static band, which in turn can cause deposits to form and ultimately cause the spiral grooves on the oil-side of the static band to lose their ability to return lubrication back to the oil-side of the seal. Accordingly, the useful life of the seal, and possibly the useful life of bearings or other components that the seal is protecting, is reduced.

SUMMARY OF THE INVENTION

In accordance with one presently preferred aspect of the invention, a radial shaft seal configured for receipt in a housing and about a shaft to sealingly isolate an air-side of the shaft seal from an oil-side of the shaft seal is provided. The seal includes an annular mounting portion; an elastomeric seal body connected to the mounting portion, and a seal lip connected to the seal body. The seal lip has an annular inner sealing surface extending axially between an oil-side end and a free air-side end. The inner sealing surface has a first groove region and an annular static band. The first groove region is spaced axially from the static band and extends between the static band and the oil-side end to pump lubrication toward the oil-side of the seal.

In accordance with another aspect of the invention, a second groove region extends along the inner sealing surface from the static band toward the air-side of the seal to direct lubrication back toward the oil-side of the seal.

In accordance with another aspect of the invention, the first groove region has a plurality of first grooves oriented in a first direction and the second groove region has a plurality of second grooves oriented in a second direction wherein the first direction is the same as the second direction.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
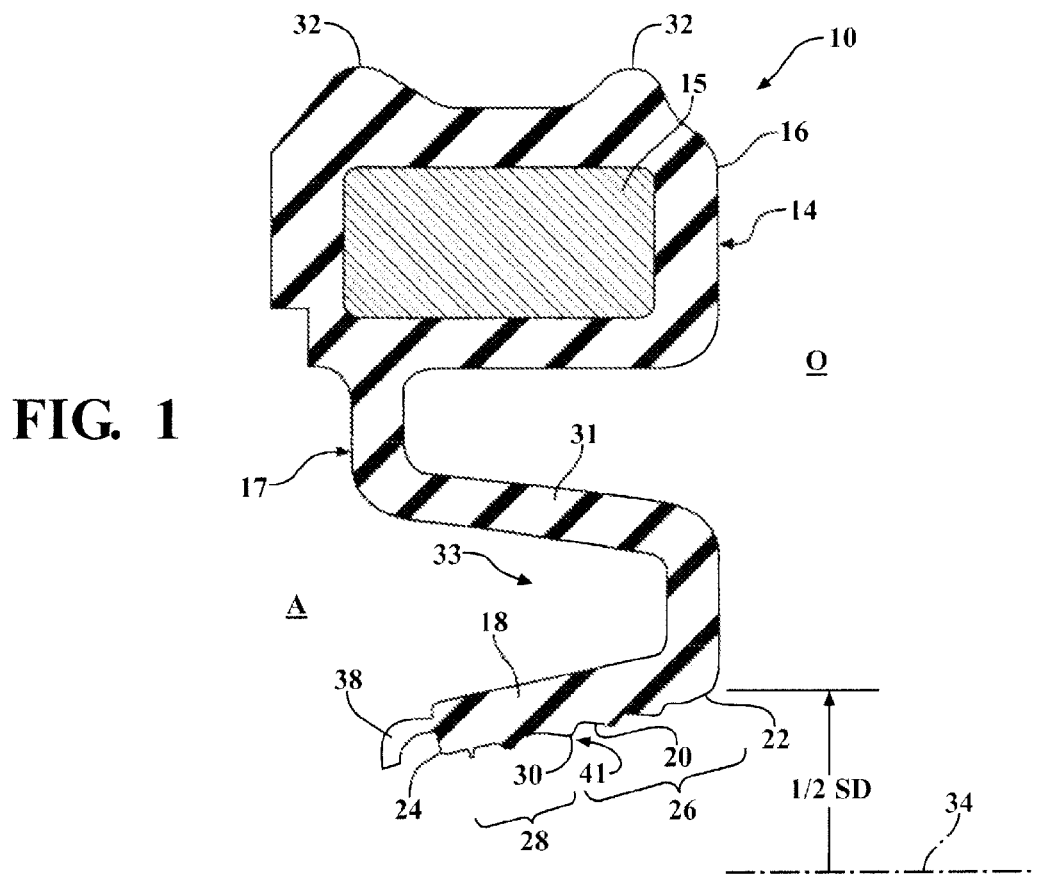
FIG. 1 is cross-sectional view of a radial shaft seal constructed according to one aspect of the invention.
Figure 1A:
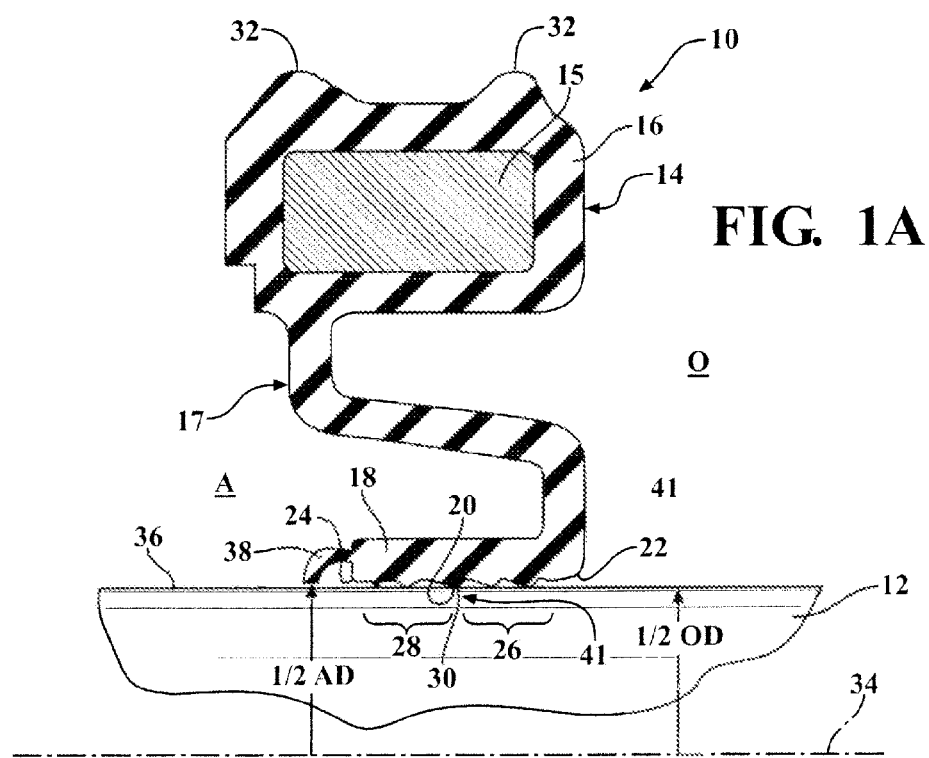
FIG. 1A is a view similar to FIG. 1 showing the seal disposed on a shaft.

Referring in more detail to the drawings, FIGS. 1 and 1A illustrate a radial shaft seal, referred to hereafter as seal 10, constructed in accordance with one aspect of the invention, wherein the seal 10 is suitable for use in a crankcase application, by way of example and without limitation, for sealing about a rotatable shaft 12 to form a radial shaft seal assembly 13. The seal 10 has an oil-side O and an axially opposite air-side A, in relation to the orientation of the seal 10 when installed, with the oil-side O facing the interior of the application being sealed and the air-side A facing the outside environment of the application being sealed. The seal 10 includes a mounting portion, such as an outer case, also referred to as collar 14, provided in part as a metal or polymeric annulus or ring structure 15 with an elastomeric seal material 16 attached thereto. The elastomeric material 16 forms a seal body 17 and extends radially inwardly to provide a seal lip 18. The seal lip 18 has an annular inner sealing surface 20 extending axially between an oil-side end 22 and a free air-side end 24. The inner sealing surface 20 has a first groove region 26 extending along the shaft 12 in sealed engagement therewith and a second groove region 28 extending along the shaft 12 in sealed engagement therewith. The first groove region 26 and the second groove region 28 are spaced axially from one another with an annular, circumferentially continuous rib, also referred to as band 30, extending therebetween. The first groove region 26 is configured to direct lubrication, e.g. oil, toward the oil-side O and the second groove region 28 is configured to direct lubrication, e.g. oil, toward the band 30 and back to the oil-side O should the lubrication happen to bypass the band 30. Meanwhile, the band 30 intermediate the respective first and second groove regions 26, 28 provides a static seal in the absence of relative movement between the seal lip 18 and the shaft 12, while also acting to inhibit the lubrication from flowing to the air-side A and residing on the air-side of the band 30. Accordingly, lubrication is inhibited from migrating from the oil-side O to the air-side A, which facilitates preventing a negative pressure build-up from occurring on the oil-side of the seal, and in the event the lubrication does bypass the band 30, the lubrication is channel via the second groove region 28 to forcefully bypass the band 30 and return to the oil-side O. As such, the lubrication is prevented from accumulating and remaining on an air-side of the band 30, which in turn prevents unwanted deposits of broken-down lubrication and other forms of contamination from accumulating on the air-side of the band 30.

The metal collar 14 may be L-shaped, or may take on any number of configurations, such as C-shaped, S-shaped, or ring shaped, as shown, depending upon the requirements of a particular application, as is known in the art. The metal reinforcing ring structure 15 is shown covered, at least in part, with the elastomeric seal material 16 on an outer surface which may be contoured with undulations 32 to provide a snug and fluid tight installation in the bore of the crankcase (not shown).

An annular bridge 31 operably connects the seal lip 18 to the seal body 17. The annular bridge 31 is connected to the oil-side end 22 of the seal lip 18 and to the seal body 17, such that the bridge 31 extends radially outwardly generally transversely from the seal lip 18 and then reverses back over the seal lip 18 in overlying fashion at an angle to a central axis 34 of the seal 10, such as between about 20-40 degrees, though the angle can range from 1-89 degrees from horizontal, as desired for the intended application. Thus, the bridge 31 provides an annular pocket 33 facing the air-side A of the seal 10.

The seal lip 18, when in the relaxed, uninstalled state, extends slightly angled by a few degrees, such as between about 1-10 degrees from the central axis 34 of the seal 10. The sealing surface 20, while in its free state, has a maximum inner diameter SD at the oil-side end 22 that is less than an outer diameter OD of a running surface 36 of the shaft 12, and thus, the entire inner sealing surface 20 is assured of being brought into sealed engagement with the running surface 36 upon assembly and in use. Further, the air-side end 24 can be formed having a non-contact dust exclusion lip, also referred to as auxiliary lip 38, that facilitates preventing contamination located on the air-side A from entering the oil-side O of the seal 10. The auxiliary lip 38 extends from the air-side end 24 of the seal lip 18 toward the air-side A and is spaced from the second groove region 28. The auxiliary lip 38 has an inner diameter AD greater than the inner diameter SD of the inner sealing surface 20 so as to remain free from contact with the shaft 12. As such, the auxiliary lip 38 does not contribute to the running torque between the seal lip 18 and the shaft running surface 36.

Figure 2:
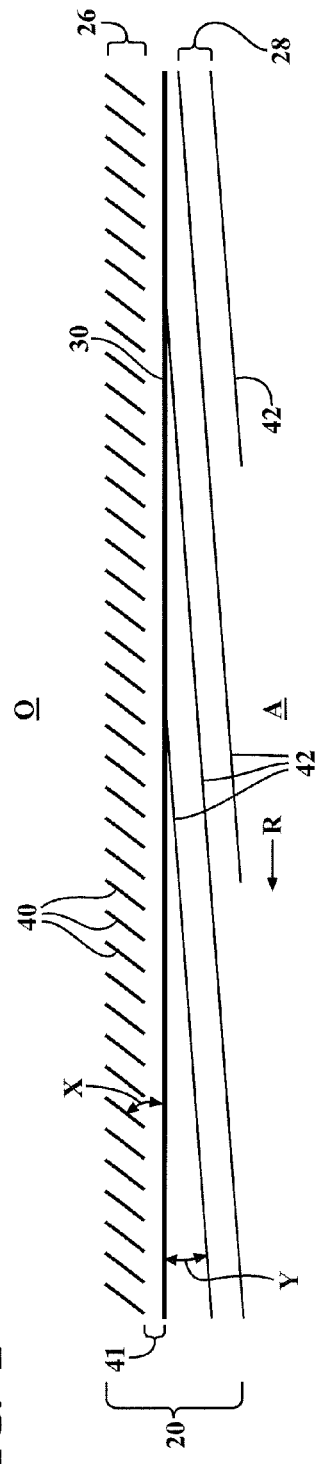
FIG. 2 is a schematic view of a sealing surface of the seal of FIG. 1 in accordance with one aspect of the invention.

In FIG. 2, the inner sealing surface 20 is shown constructed in accordance with one aspect of the invention. The circumferentially continuous annular static sealing band 30 of the inner sealing surface 20 is shown extending circumferentially between the first and second groove regions 26, 28. The first groove region 26 has a plurality of first grooves 40 extending in spaced relation from the static sealing band 30 to the oil-side end 22 of the seal lip 18. Accordingly, the first grooves 40 stop short of the band 30 and thus, do not merge with the band 30. As such, a non-grooved region 41 extends between the first grooves 40 and the band 30, and thus, the lubrication within the first groove region 26 is not promoted to reach the band 30 in significant volume, though it is anticipated that some lubrication from the oil-side O will reach the band 30 to facilitate reducing the running friction between the band 30 and the running surface 36 of the shaft 12.

The second groove region 28 has a plurality of second grooves 42 extending from the static sealing band 30 toward the air-side end 24 of the seal lip 18. Accordingly, the second grooves 42 extend to the band 30 and thus, merge with the band 30. Accordingly, given the second grooves 42 are configured to pump lubrication in the same direct as the first grooves 40, any lubrication that bypasses the band 30 and enters the second grooves 42 is pumped back into direct contact with the band 30 and tends to bypass the band 30 back to the first groves 40, wherein the first grooves 40 continue to pump the lubrication back to the oil-side O.

The first grooves 40 are oriented in a first direction and the second grooves 42 are oriented in a second direction, wherein the first direction is the same or substantially the same as the second direction. Accordingly, as eluded to above, the angular direction of spiral or helix of the first and second grooves 40, 42 is the same, thereby tending to pump the lubrication in the same direction, namely, toward the oil-side O of the seal 10. The first and second grooves 40, 42 are shown, by way of example, as being linearly straight and extending parallel or substantially parallel with one another in inclined relation to the direction of relative seal rotation R with the shaft 12. The respective angles of inclination of the first and second grooves 40, 42, X and Y, wherein X is greater than Y, from the intermediate band 30 toward the oil-side O is such that during relative rotation R between the shaft 12 and the seal lip 18, the lubrication on the oil-side O that reaches the first and second grooves 40, 42 is pumped back toward the oil-side O.

Figure 3:
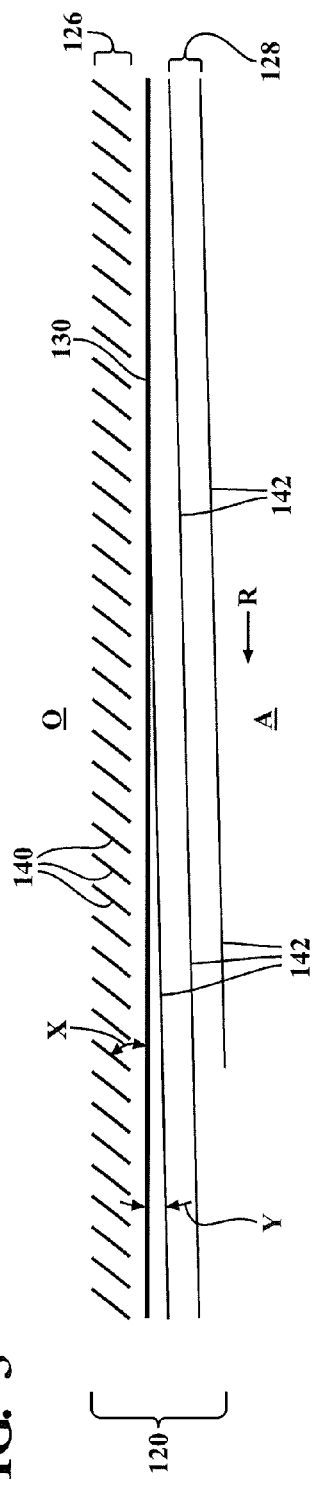
FIG. 3 is a schematic view of a sealing surface of the seal of FIG. 1 in accordance with another aspect of the invention.
Figure 5:
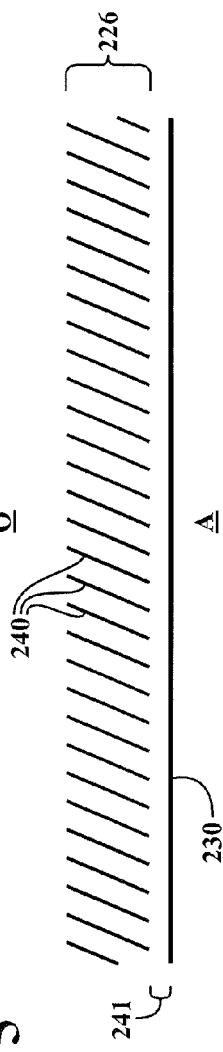
FIG. 5 is a schematic view of a sealing surface of the seal of FIG. 4 in accordance with another aspect of the invention.

In FIG. 3, an inner sealing surface 120 is shown constructed in accordance with another aspect of the invention, wherein the same reference numerals as used above, offset by a factor of 100, are used to identify like features. The inner surface 120 includes a first groove region 126, a second groove region 128, and a circumferentially continuous annular static sealing band 130 between the first and second groove regions 126, 128. The first groove region 126 has a plurality of individual first grooves 140 configured the same as the first grooves 40 discussed above. Further, the second groove region 128 has a plurality of individual second grooves 142, however, unlike the second grooves 42 discussed above, the second grooves 142 are configured as individual threads extending between about 180-360 degrees about the circumference of the sealing surface 120. Stated another way, the individual second grooves 142 extend at least 180 degrees and less than 360 degrees. Accordingly, the second grooves 142 extend at a reduced angle of inclination relative to the static band 130 than do the second grooves 42, wherein the second grooves 142 are shown as extending at an angle of inclination Y relative to the static band 130. The first and second grooves 140, 142 are shown, as discussed above, as being linearly straight and extending parallel or substantially parallel with one another in inclined relation to the direction of relative seal rotation R with the shaft. The angles of inclination of the first and second grooves 140, 142 from the intermediate band 130 toward the oil-side O, X and Y, respectively, with X being greater than Y, are such that during relative rotation R between the shaft and the seal lip, the lubrication on the oil- side O that reaches the first and second grooves 140, 142 is pumped back toward the oil-side O.

Figure 4:
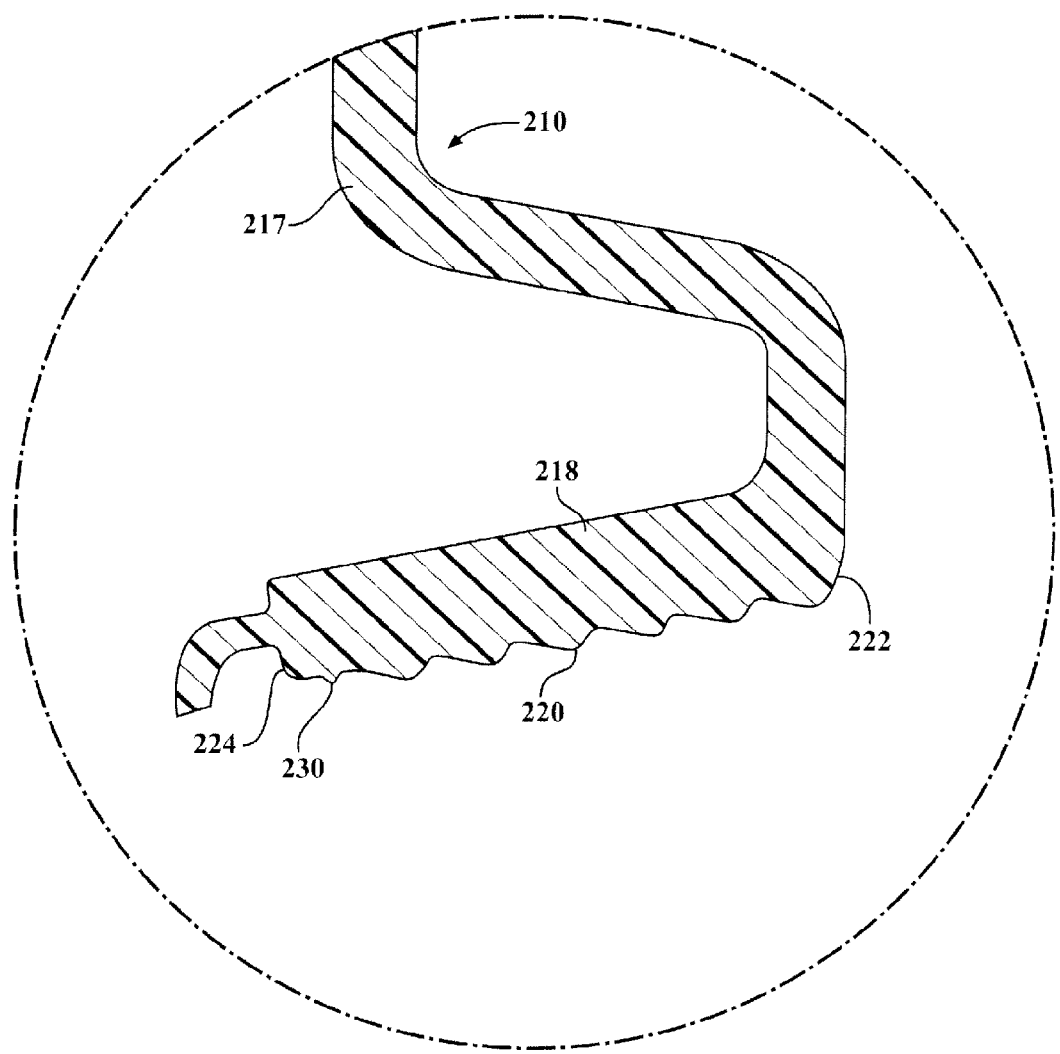
FIG. 4 is cross-sectional view of a radial shaft seal constructed according to another aspect of the invention.

In FIG. 4, a seal 210 is shown constructed in accordance with another aspect of the invention, wherein the same reference numerals as used above, offset by a factor of 200, are used to identify like features. The seal 210 includes all the same features discussed above with regard to the previous seal construction with the exception of a second groove region. Accordingly, the seal 210 includes a collar, as discussed above (not shown), and a seal body 217 that extends radially inwardly to provide a seal lip 218. The seal lip 218 has an annular inner sealing surface 220 extending axially between an oil-side end 222 and a free air-side end 224. The inner sealing surface 220 has a first groove region 226 configured to extend along a shaft in sealed engagement therewith, as discussed above, and an annular, circumferentially continuous band 230 spaced from the first groove region 226 toward and adjacent the air-side end 224. The first groove region 226 is configured to pump lubrication toward the oil-side O and the band 230 is configured to prevent the lubrication from bypassing the band 30. The first groove region 226 includes first grooves 240, as discussed above, wherein the first grooves 240 are spaced axially from and stop short of the band 30, thereby forming a circumferentially extending annular non-grooved region 241 between the band 230 and the first groove 240.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft having a running surface to sealingly isolate an air-side of the shaft seal from an oil-side of the shaft seal, comprising:
    an annular mounting portion extending about a central axis;
    an elastomeric seal body connected to said mounting portion;
    a seal lip connected to said seal body, said seal lip having a conical, annular inner sealing surface extending axially from an oil-side end having a first diameter to a free air-side end having a second diameter, said first diameter being less than a diameter of the shaft running surface and said second diameter being less than said first diameter, thereby ensuring the entirety of said conical, annular inner sealing surface is brought into sealed engagement with the shaft running surface, said inner sealing surface having a first groove region extending along the shaft in sealed engagement with the running surface and a circumferentially continuous static rib, said first groove region being spaced axially from said static rib and extending between said static rib and said oil-side, said first groove region including a plurality of first grooves inclined relative to said static rib along a first direction, said first direction being configured to pump lubrication toward said oil side of said radial shaft seal during relative rotation of said radial shaft seal with said shaft along a direction R;
    said inner sealing surface further including a second groove region extending along the inner sealing surface from said static rib toward said air-side of said radial shaft seal, said second groove region having a plurality of individual second grooves inclined relative to said static rib along a second direction, said second direction being configured to pump lubrication toward said oil side of said radial shaft seal during relative rotation of said radial shaft seal with said shaft along the direction R; and
    wherein each of said individual second grooves extends along a reduced angle of inclination relative to said static rib as compared with said first grooves, at least one of said individual second grooves merging with said static rib.

2. The radial shaft seal of claim 1 wherein said first grooves do not merge with said static rib.

3. The radial shaft seal of claim 1 wherein said first grooves are linearly straight and said second grooves are linearly straight.

4. The radial shaft seal of claim 1 further including an auxiliary lip extending from said air-side end of said seal lip.

5. A radial shaft seal configured for receipt in a housing and about a shaft to sealingly isolate an air-side of the shaft seal from an oil-side of the shaft seal, comprising:
    an annular mounting portion;
    an elastomeric seal body connected to said mounting portion;
    a seal lip connected to said seal body, said seal lip having an annular inner sealing surface extending axially between an oil-side end and a free air-side end, said inner sealing surface having a first groove region extending along the shaft in sealed engagement therewith and a circumferentially continuous static rib, said first groove region being spaced axially from said static rib and extending between said static rib and said oil-side end to pump lubrication toward said oil-side of said seal, said first groove region including a plurality of first grooves inclined relative to said static rib along a first direction, said first direction being configured to pump lubrication toward said oil side of said seal during relative rotation of said radial shaft seal with said shaft along a direction R;
    said inner sealing surface further including a second groove region extending along the inner sealing surface from said static rib toward said air-side of said seal to pump lubrication back toward said oil-side of said seal, said second groove region having a plurality of individual second grooves inclined relative to said static rib along a second direction, said second direction being configured to pump lubrication toward said oil side of said seal during relative rotation of said radial shaft seal with said shaft along the direction R;
    wherein each of said individual second grooves extends along a reduced angle of inclination relative to said static rib as compared with said first grooves; and
    wherein each of said individual second grooves extends at least 180 degrees and less than 360 degrees about said inner surface.

* * * * *